US012122930B2

(12) United States Patent
Moskal et al.

(10) Patent No.: US 12,122,930 B2
(45) Date of Patent: Oct. 22, 2024

(54) COLOR-CHANGE AND ERASABLE WRITING COMPOSITIONS, WRITING INSTRUMENTS, AND SYSTEMS

(71) Applicant: Crayola LLC, Easton, PA (US)

(72) Inventors: Michael Moskal, Pottstown, PA (US); Abigail E. Meyer, West Point, NY (US); Margaret Katherine Brogan, Downingtown, PA (US)

(73) Assignee: Crayola LLC, Easton, PA (US)

( * ) Notice: Subject to any disclaimer, the term of this patent is extended or adjusted under 35 U.S.C. 154(b) by 0 days.

(21) Appl. No.: 18/533,570

(22) Filed: Dec. 8, 2023

(65) Prior Publication Data

US 2024/0101853 A1    Mar. 28, 2024

Related U.S. Application Data

(63) Continuation of application No. 16/733,916, filed on Jan. 3, 2020, now Pat. No. 11,866,603.

(60) Provisional application No. 62/787,842, filed on Jan. 3, 2019.

(51) Int. Cl.
| | |
|---|---|
| *C09D 13/00* | (2006.01) |
| *B43K 19/14* | (2006.01) |
| *C09D 9/00* | (2006.01) |

(52) U.S. Cl.
CPC .............. *C09D 13/00* (2013.01); *B43K 19/14* (2013.01); *C09D 9/00* (2013.01)

(58) Field of Classification Search
None
See application file for complete search history.

(56) References Cited

U.S. PATENT DOCUMENTS

| | | | |
|---|---|---|---|
| 3,491,043 A | 1/1970 | Zmitrovis | |
| 3,957,495 A | 5/1976 | Teranishi | |
| 4,557,618 A | 12/1985 | Iwata et al. | |
| 4,602,264 A | 7/1986 | Shioi et al. | |
| 6,017,661 A | 1/2000 | Lindsay et al. | |
| 6,039,797 A | 3/2000 | Fistner | |
| 6,060,223 A | 5/2000 | Nohr et al. | |
| 6,120,949 A | 9/2000 | Nohr et al. | |
| 6,127,073 A | 10/2000 | Nohr et al. | |
| 6,203,603 B1 | 3/2001 | Takayama et al. | |
| 6,248,692 B1 | 6/2001 | Sano et al. | |
| 6,313,066 B1 | 11/2001 | Takayama et al. | |
| 6,326,332 B1 | 12/2001 | Takayama et al. | |
| 6,505,984 B2 | 1/2003 | Smith et al. | |
| 7,229,487 B2 * | 6/2007 | Godbout ................ | C09D 11/18 106/31.43 |
| 7,294,182 B2 | 11/2007 | Jang et al. | |
| 7,488,380 B2 * | 2/2009 | Kwan ................... | C09D 11/17 106/31.64 |
| 10,774,232 B2 | 9/2020 | Gouerec et al. | |
| 2001/0008164 A1 | 7/2001 | Sano et al. | |
| 2002/0143080 A1 | 10/2002 | Yui et al. | |
| 2005/0120919 A1 | 6/2005 | Smith et al. | |
| 2005/0159311 A1 | 7/2005 | Sano et al. | |
| 2007/0281139 A1 | 12/2007 | Mehta et al. | |
| 2009/0324846 A1 | 12/2009 | Tomaschke et al. | |
| 2010/0021840 A1 | 1/2010 | Sano et al. | |
| 2010/0209839 A1 | 8/2010 | Kabul et al. | |
| 2010/0275813 A1 | 11/2010 | Kurihara et al. | |
| 2010/0304142 A1 | 12/2010 | Itou et al. | |
| 2011/0183248 A1 | 7/2011 | Kabai et al. | |
| 2017/0316713 A1 | 11/2017 | Hyman et al. | |
| 2018/0112095 A1 | 4/2018 | Falken et al. | |

FOREIGN PATENT DOCUMENTS

| | | |
|---|---|---|
| CN | 107033677 A | 8/2017 |
| GB | 1403882 A | 8/1975 |
| JP | 2000160041 A | 6/2000 |
| JP | 4212211 B2 | 1/2009 |
| JP | 2015174437 A | 10/2015 |
| KR | 20120058229 A | 6/2012 |
| KR | 101838965 B1 * | 4/2018 |

OTHER PUBLICATIONS

Nytal 400 Technical Data Sheet, SpecialChem, downloaded from the internet on Oct. 12, 2022, https://adhesives.specialchem.com/product/a-vanderbilt-chemicals-nytal-400, 1 page.
Oh et al., "Preparation of a Photobleachable Dye Capsule Nanocomposite for Reusable Recording Media", Key Engineering Materials, vols. 277-279, pp. 1029-1034.
Stearyl Alcohol (C18 Alcohol), ChemBK, downloaded from the internet on Jul. 6, 2023, https://www.chembk.com/en/chem/Stearyl Alcohol (C18 Alcohol), 3 pages.
Takayama et al., "A New Erasable Ink for Paper Recycling and Reuse", NIP & Digital Fabrication Conference, 1999 International Conference on Digital Printing Technologies, 2 pages. (Abstract only).
Entire patent prosecution history of U.S. Appl. No. 16/733,916, filed Jan. 1, 2020, entitled, "Color-Change and Erasable Writing Compositions, Writing Instruments, and Systems".

\* cited by examiner

*Primary Examiner* — Tae H Yoon
(74) *Attorney, Agent, or Firm* — Buchanan Ingersoll & Rooney PC

(57) ABSTRACT

The present invention provides writing compositions that are capable of being erased or changed in color chemically. The present invention also provides erasing media for erasing or changing the color of marks produced with the writing compositions, as well as writing systems and incorporating the erasing media and the writing compositions. The present invention further provides writing instruments produced using the writing compositions.

13 Claims, No Drawings

COLOR-CHANGE AND ERASABLE WRITING COMPOSITIONS, WRITING INSTRUMENTS, AND SYSTEMS

CROSS-REFERENCE TO RELATED APPLICATION

This application is a continuation of and claims the benefit of, U.S. application Ser. No. 16/733,916, now U.S. Pat. No. 11,866,603, entitled COLOR-CHANGE AND ERASABLE WRITING COMPOSITIONS, WRITING INSTRUMENTS, AND SYSTEMS, filed Jan. 3, 2020, which claims the benefit of U.S. Provisional Application No. 62/787,842, entitled COLOR-CHANGE AND ERASABLE WRITING COMPOSITIONS, WRITING INSTRUMENTS, AND SYSTEMS, filed on Jan. 3, 2019, the disclosures of both which are incorporated herein by reference in their entireties for all purposes.

FIELD OF THE INVENTION

The present invention relates generally to writing compositions and instruments for use as marking or coloring materials. More specifically, the present invention relates to writing compositions that may be chemically or thermally erased or changed in color, and relates to chemical compositions that permanently erase or change the color of the writing compositions.

BACKGROUND OF THE INVENTION

Art materials for the entertainment and developmental benefit of children are well-known. For example, drawing and writing materials, such as pencils and crayons, are typically given to children to produce artwork and to stimulate the children's creativity and imagination. To contribute to a pleasant use experience for children, pencil cores and crayons must be capable of smooth laydown and high intensity or vibrancy of the resulting colored markings. Children especially enjoy using crayons to fill in coloring books and create drawings. However, one drawback of crayons is that the marks made with crayons cannot be erased easily. Crayon compositions that require mechanical erasure with an eraser are known, for example, as set forth in U.S. Pat. No. 6,505,984 to Smith et al., which is incorporated by reference herein. Unfortunately, one of the difficulties with mechanical erasure is that the mark may be smudged as the child attempts to remove the mark with the eraser. Another issue is that the mechanical action of erasure may damage the material upon which the mark is placed, such as paper.

Another significant drawback related to typical crayon compositions is that they are often fixed in color when applied to a material such as paper. That is, they are typically incapable of color change. Children often enjoy the ability to change or alter the colors of portions of artwork, and conventional crayons do not generally impart this ability.

Traditional formulations for color-changing or erasable writing compositions, such as thermochromic inks, generally include microcapsules. The microcapsules encapsulate a leuco dye (i.e., an electron-donating compound). The microcapsules also include a developer (i.e., an electron-accepting compound, such as a phenolic resin) and a reversible fusible reaction medium (e.g., a solvent or wax). However, microencapsulated leuco dyes are costly to use to produce color-changing or chemically erasable writing compositions.

Thus, there exists a need for writing or marking compositions that can be erased without mechanical action or changed in color after application. There also exists a need for writing instruments and coloring systems that provide for chemical or thermal color change. There exists a need for writing or marking compositions capable of chemical or thermal erasure or color-change that do not use costly microencapsulated leuco dyes. Additionally, there exists a need for writing instruments and systems that provide for chemical or thermal erasure of marks to prevent smudging and substrate damage resulting from mechanical erasure.

SUMMARY OF THE INVENTION

An embodiment of the present invention provides writing compositions that can be applied to materials and erased without mechanical action. The writing compositions comprise a phenolic resin (i.e., an electron acceptor), a reaction medium comprising one or more of fatty acids, waxes, alkanes, or alkenes (e.g., stearic acid and/or stearyl alcohol), at least one leuco dye (i.e., an electron donor), and optionally at least one additive (e.g., plasticizers). The writing compositions may also include an inert mineral filler (e.g., wollastonite, talc, kaolin clay, burgess clay, mica, bentonite, calcined clay, or calcium carbonate). The writing compositions display thermochromicity and can be temporarily erased by the application of heat. Cooling of the heated writing compositions causes the colored state of the writing compositions to return.

Another embodiment of the present invention provides writing compositions that can be applied to materials and changed in color chemically or thermally. The writing compositions comprise a phenolic resin, a reaction medium comprising one or more of fatty acids, waxes, alkanes, or alkenes (e.g., stearic acid and/or stearyl alcohol), at least one leuco dye, at least one of a pigment or a non-leuco dye, and optionally at least one additive (e.g., lubricants, plasticizers). The writing compositions may also include an inert mineral filler (e.g., wollastonite, talc, kaolin clay, burgess clay, mica, bentonite, calcined clay, or calcium carbonate). The writing compositions display thermochromicity and can be temporarily changed in color by the application of heat. Cooling of the heated writing compositions causes the original color of the writing compositions to return.

A further embodiment of the present invention provides an erasing medium capable of permanently erasing or changing the color of the writing compositions of the above embodiments. One embodiment of the erasing medium comprises water, at least one pH adjuster (e.g., citric acid, triisopropylamine), at least one surfactant, and at least one preservative (e.g., an antimicrobial preservative). Another embodiment of the erasing medium comprises at least one alcohol (e.g., isopropyl alcohol, methanol, and/or ethanol), at least one pH adjuster (e.g., citric acid, triisopropylamine), at least one surfactant, and at least one preservative (e.g., an antimicrobial preservative).

Another embodiment of the present invention provides a writing system having both a writing composition and an erasing medium capable of permanently erasing or changing the color of marks produced by the writing composition. The writing composition of the writing system comprises a phenolic resin, a reaction medium comprising one or more of fatty acids, waxes, alkanes, or alkenes (e.g., stearic acid and/or stearyl alcohol), at least one leuco dye, and optionally at least one additive. The writing composition may also include a mineral filler and/or at least one of a pigment or a non-leuco dye. The erasing medium of the writing system comprises one or more of water, alcohol, or a mixture of alcohols, at least one proton donor or electron acceptor, at least one surfactant, and at least one preservative.

A further embodiment of the present invention provides writing instruments (e.g., pencils, crayons) comprising writing compositions according to the present invention.

Yet other embodiments of the present invention provide chemical and thermal methods of erasing marks produced using writing compositions according to the present invention.

Other embodiments of the present invention provide chemical and thermal methods of changing the color of marks produced using writing compositions according to the present invention.

DETAILED DESCRIPTION OF THE INVENTION

The present invention relates to writing compositions capable of undergoing a color change or being erased when exposed to heat or when brought into contact with an erasing medium according to aspects of the present invention. Marks created with the writing compositions interact chemically with the erasing medium such that the marks are erased or a color change is produced. The writing compositions do not use expensive microencapsulated leuco dyes.

The erasable writing compositions generally comprise one or more leuco dyes (i.e., electron donors) and at least one phenolic resin developer (i.e., an electron acceptor) dispersed in a reaction medium comprising one or more of fatty acids, waxes, alkanes, or alkenes (e.g., stearic acid and/or stearyl alcohol). The color-change compositions generally comprise one or more leuco dyes and at least one phenolic resin developer dispersed in a reaction medium comprising one or more of fatty acids, waxes, alkanes, or alkenes (e.g., stearic acid and/or stearyl alcohol), but also include at least one of a pigment (a non-erasable or permanent dry colorant) or a non-leuco dye (i.e., a non-erasable or permanent dye). It is believed that the leuco dyes and the phenolic resin developers form a colored complex within the reaction medium. Variations in color intensity may be achieved by varying the compositional quantities of leuco dyes and phenolic resin developers. Both of the erasable and the color-change writing compositions may include an inert mineral filler for reinforcement and improving the strength of writing instruments produced with the writing compositions.

The writing compositions may be extruded or injection molded into different shapes or writing instruments (e.g., pencils, pencil cores, crayons). Additionally, the writing compositions may be sheathed in different materials, e.g., paper or protective coatings, to impart further breakage resistance.

An embodiment of an erasable or color-change writing composition according to the present invention includes at least one leuco dye. The erasable or color-change compositions of the present invention may include at least one leuco dye in any suitable amount. Preferably, in both the erasable writing composition embodiments and the color-change writing composition embodiments, the leuco dye is present in an amount between about 0.1% and 6% by weight of the composition. More preferably, the leuco dye is present in an amount between about 1% and 3% by weight. Even more preferably, the leuco dye is present in an amount of about 1.5% to 2.5% by weight.

An embodiment of an erasable or color-change writing composition according to the present invention includes at least one suitable phenolic resin to act as a color developer in complex with at least one leuco dye. Both the erasable and color-change compositions of the present invention may include at least one phenolic resin in any suitable amount. Preferably, in both the erasable writing composition embodiments and the color-change writing composition embodiments, the phenolic resin is present in an amount between about 0.1% and 10% by weight of the composition. More preferably, the phenolic resin is present in an amount between about 0.5% and 7% by weight. Even more preferably, the phenolic resin is present in an amount of about 1% to 6% by weight.

The erasable and color-change writing compositions also include a reaction medium comprising one or more of fatty acids, waxes, alkanes, or alkenes. Preferably, the erasable and color-change writing compositions include stearic acid as part of the reaction medium. The writing compositions of the present invention may include stearic acid in any suitable amount. Preferably, in the erasable writing composition embodiments, the stearic acid is present in an amount between about 35% and 50% by weight of the composition. More preferably, the stearic acid is present in an amount between about 40% and 47% by weight. Even more preferably, the stearic acid is present in an amount of about 43% and 45% by weight.

Preferably, in the color-change writing composition embodiments, the stearic acid is present in an amount between about 35% and 45% by weight of the composition. More preferably, the stearic acid is present in an amount between about 38% and 43% by weight. Even more preferably, the stearic acid is present in an amount of about 40% and 42% by weight.

The erasable and color-change writing compositions also preferably include stearyl alcohol as part of the reaction medium. The writing compositions of the present invention may include stearyl alcohol in any suitable amount. Preferably, in the erasable writing composition embodiments, the stearyl alcohol is present in an amount between about 35% and 50% by weight of the composition. More preferably, the stearyl alcohol is present in an amount between about 40% and 47% by weight. Even more preferably, the stearyl alcohol is present in an amount of about 43% and 45% by weight.

Preferably, in the color-change writing composition embodiments, the stearyl alcohol is present in an amount between about 35% and 45% by weight of the composition. More preferably, the stearyl alcohol is present in an amount between about 38% and 43% by weight. Even more preferably, the stearyl alcohol is present in an amount between about 40% and 42% by weight.

Embodiments of the erasable and color-change writing compositions may also include a mineral filler (e.g., wollastonite, talc, kaolin clay, burgess clay, mica, bentonite, calcined clay, or calcium carbonate). The mineral filler should be inert (i.e., the mineral filler is not capable of interfering chemically with leuco dye and/or phenolic resin). Both the erasable and color-change compositions of the present invention may include at least one inert mineral filler in any suitable amount. Preferably, in both the erasable writing composition embodiments and the color-change writing composition embodiments, the mineral filler is present in an amount between about 1% and 10% by weight of the composition. More preferably, the mineral filler is present in an amount between about 3% and 8% by weight. Even more preferably, the mineral filler is present in an amount between about 4% and 6% by weight.

Embodiments of the color-change writing compositions also include pigments and non-leuco dyes. The pigments and non-leuco dyes are essentially non-erasable or permanent when used to mark a material, such as paper. They are resistant to erasure and/or color change when heated or when brought into contact with an erasing medium according to the present invention. Preferably, in the color-change writing composition embodiments, the pigments and/or non-leuco dyes are present in an amount between about 1% and 8% by weight of the composition. More preferably, the pigments and/or non-leuco dyes are present in an amount between about 2% and 7% by weight. Even more preferably, the pigments and/or non-leuco dyes are present in an amount of about 4% and 6% by weight.

According to certain embodiments, writing compositions of the present invention include optional additives. These additives may include, but are not limited to, dispersing agents, thermal stabilizers, scents, glitter, lubricants, plasticizers, strengthening agents, anti-bloom agents, preservatives, and antioxidants. In particular embodiments, the compositions of the present invention comprise between about 0.1% and about 1% by weight additive(s). Other particular embodiments of the compositions comprise between about 0.3% and about 0.8% by weight additives.

Such additives are readily available from numerous sources. One or more preservatives, such as anti-microbial agents and fungicides, can be added to increase the shelf life of the writing compositions according to the present invention. Some examples of preservatives include Fungitrol® 940, Kathon® LX, Nuosept® 95, Acticide® LA, and Polyphase® P100. Process aids, such as Hydropalat® 44, can be added to aid in mixing of the components. Lubricants or plasticizers, such as oleic acid and isobutyl stearate, can be added to soften the compositions to improve the transfer of compositional constituents, such as the colorant, to the materials to be marked. One or more antioxidants may be added to the compositions to aid the titanium dioxide in masking or impeding premature color development of the colorant. A scent or fragrance may also be added to the composition.

According to a preferred embodiment, an erasable writing composition comprises a phenolic resin, stearic acid, stearyl alcohol, and a leuco dye. In another preferred embodiment of the present invention, a color-change writing composition comprises a phenolic resion, stearic acid, stearyl alcohol, a lueco dye, and a pigment and/or a non-leuco dye.

The erasable and color-change writing compositions produced according to embodiments of the invention set forth herein may also be formed into different shapes, including into pencil core shapes, crayon shapes, or mechanical pencil core shapes by a variety of processes; that is, the compositions are versatile with respect to their processing capability. For example, the erasable and color-change writing compositions may be injection molded, hot-melt extruded, or ram extruded into pencil cores or crayon stick shapes. The compositions may be formed into any shape suitable for a writing instrument via injection molding and/or extrusion. Despite the differences in these processing techniques, the compositions according to embodiments of the invention herein are generally suitable for either process and produce writing instruments having the same desirable properties.

Crayons, pencil cores and/or pencils produced from the erasable and/or color-change writing compositions according to embodiments of the invention herein may be covered or wrapped in supportive sheaths or coatings. The sheaths may be made of wood, paper, or plastic. Alternatively, or in addition to a sheath, a coating layer of thermoplastic material (e.g., HDPE) may be applied to the outside of pencil cores and/or pencils produced from the compositions according to the invention herein.

Colored marks made on a surface with either of the erasable or the color-change writing compositions may exhibit thermochromicity; that is, marks made with the writing compositions may be temporarily erased or changed in color by exposure to heat. It is believed that when heat is applied to the writing compositions, the reaction medium melts and causes the colored electron donor-electron acceptor complex to separate. The separation results in the color change or erasure (i.e., decolorization). When the heated composition cools, however, the complex reforms as the reaction medium solidifies and the previously colored state returns. Thus, the color change or the erasure of written compositions according to the present invention is temporary upon exposure to heat.

Colored marks made on a surface with either of the erasable or the color-change writing compositions may interact chemically with an erasing medium or solvent. It has been surprisingly found that the marks made by erasable writing compositions according to the present invention are substantially and permanently erasable with the erasing medium/solvent (i.e., marks made with the erasable writing compositions may be substantially or mostly rendered colorless by applying the erasing medium/solvents according to aspects of the present invention). It has also been surprisingly found that the marks made by color-change writing compositions according to the present invention may be permanently altered in color with the erasing medium/solvent (i.e., marks made with the color-change writing compositions may be substantially, permanently, and noticeably changed in color by applying the erasing medium/solvent).

It is believed that the erasing medium or solvent partially dissolves the reaction medium of the writing compositions, which is believed to lead to a separation of the colored leuco dye-phenolic resin complex. Upon evaporation of an applied erasing medium/solvent, the colored marks remain either erased or changed in color without reversion to the color of the originally applied mark. One embodiment of the erasing medium/solvent generally comprises water, at least one proton donor or electron acceptor (e.g., citric acid, triisopropylamine), at least one surfactant, and at least one preservative (e.g., an antimicrobial preservative). Another embodiment of the erasing medium/solvent generally comprises alcohol or a mixture of alcohols (e.g., isopropyl alcohol, methanol, ethanol), at least one proton donor or electron acceptor (e.g., citric acid, triisopropylamine), at least one surfactant, and at least one preservative.

An embodiment of erasing medium according to the present invention includes water. The erasing media of the present invention may include water in any suitable amount. Preferably, the water is present in an amount between about 65% and 80% by weight of the composition. More preferably, the water is present in an amount between about 70% and 75% by weight. Even more preferably, the water is present in an amount of about 71% to 74% by weight.

Another embodiment of the erasing medium according to the present invention includes at least one alcohol or blends of alcohols (e.g., isopropyl alcohol, methanol, ethanol). The erasing media of the present invention may include alcohol in any suitable amount. Preferably, the alcohol is present in an amount between about 65% and 80% by weight of the composition. More preferably, the alcohol is present in an amount between about 70% and 75% by weight. Even more preferably, the alcohol is present in an amount of about 71% to 74% by weight.

The erasing media/solvents of the present invention also include at least one proton donor or electron acceptor (e.g., citric acid and/or triisopropylamine). Preferred embodiments include both citric acid and triisopropylamine. The proton donors or electron acceptors may be present in any suitable amount. Proton donors or electron acceptors, or combinations thereof is preferably included in an amount between about 20% and about 30% by weight of the erasing medium. More preferably, proton donors or electron acceptors, or combinations thereof is present in an amount between about 23% and 28% by weight of the composition. Preferred embodiments include both citric acid and triisopropylamine. Preferably, triisopropylamine is included in an amount of between about 1% and about 30% by weight of the composition. Preferably, citric acid is present in an amount between about 0.1% and about 1% by weight.

The erasing media of the present invention also comprise at least one surfactant. It is believed the surfactant aids in dissolving the reaction medium, facilitating color change and/or erasure. The surfactant may be present in any suitable amount in the erasing media. Preferably, the surfactant is present in an amount between about 0.1% and 1% by weight. More preferably, the surfactant is present in an amount between about 0.3% and 0.8%.

Additionally, the erasing media of the present invention comprise at least one preservative. One or more preservatives, such as anti-microbial agents and fungicides, can be added to increase the shelf life of the compositions according to the present invention. In particular embodiments, the erasing media of the present invention comprise between about 0.5% and about 2% by weight preservatives. Other particular embodiments of the erasing media comprise between about 1% and about 1.5% by weight preservatives.

A further embodiment of the present invention is directed to a writing system having both an erasable or color-change writing composition in accordance with embodiments herein, and an erasing medium according embodiments herein.

As used herein, a percentage (%) refers to a weight percentage of the composition, unless indicated otherwise.

The embodiments of the invention are described above using the term "comprising" and variations thereof. However, it is the intent of the inventors that the term "comprising" may be substituted in any of the embodiments described herein with "consisting of" and "consisting essentially of" without departing from the scope of the invention.

The following examples are provided to describe the invention in greater detail and are intended to illustrate, not limit, the invention.

EXAMPLES

While exemplary compositions are set forth below, alternative compositions will be apparent to those skilled in the art. Such artisans will be able to modify the compositions with an eye toward the desired performance properties and intended use.

Example 1

A basic erasable writing composition according to certain embodiments of the invention herein is shown in Table 1. The erasable writing composition is formed by combining stearic acid, stearyl alcohol, phenolic resin, and leuco dye.

TABLE 1

Basic Erasable Writing Composition

| Component | Weight Percentage (wt %) |
|---|---|
| stearic acid | 49.08 |
| stearyl alcohol | 49.08 |
| phenolic resin | 0.53 |
| leuco dye | 1.31 |
| TOTAL | 100 |

Example 2

A basic erasable writing composition according to certain embodiments of the invention herein is shown in Table 2. The erasable writing composition is formed by combining stearic acid, stearyl alcohol, phenolic resin, a mineral filler, and leuco dye.

TABLE 2

Basic Erasable Writing Composition

| Component | Weight Percentage (wt %) |
|---|---|
| stearic acid | 44.17 |
| stearyl alcohol | 44.17 |
| phenolic resin | 2.36 |
| leuco dye | 1.65 |
| Mineral filler | 7.65 |
| TOTAL | 100 |

Example 3

Another erasable red writing composition according to certain embodiments of the invention herein is shown in Table 3. The erasable writing composition is formed by combining stearic acid, stearyl alcohol, phenolic resin, a mineral filler, and leuco dyes.

TABLE 3

Red Erasable Writing Composition

| Component | Grams | Weight Percentage (wt %) |
|---|---|---|
| stearic acid | 75 | 43.40278 |
| stearyl alcohol | 75 | 43.40278 |
| phenolic resin (Durez 32420) | 10 | 5.787037 |
| leuco dye (Pergascript Orange 1-G) | 2.1 | 1.215278 |
| Leuco dye (Pergascript Red 1-6B) | 0.7 | 0.405093 |
| Mineral filler (Ultrex 96 (BASF) calcined clay) | 10 | 5.787037 |
| TOTAL | 172.8 | 100 |

Example 4

A purple-to-blue color-change writing composition according to certain embodiments of the invention herein is shown in Table 4. The erasable writing composition is formed by combining stearic acid, stearyl alcohol, phenolic resin, a mineral filler, leuco dye, and a (permanent) dry pigment.

TABLE 4

Purple-To-Blue Color-Change Writing Composition

| Component | Grams | Weight Percentage (wt %) |
|---|---|---|
| stearic acid | 75 | 40.8719346 |
| stearyl alcohol | 75 | 40.8719346 |
| Mineral filler (Ultrex 96 (BASF) calcined clay) | 10 | 5.449591281 |
| phenolic resin (Durez 32420) | 10 | 5.449591281 |
| Leuco dye (Pergascript Red 1-6B) | 3.5 | 1.907356948 |
| Dry pigment (Blue Cerulean Dry Color) | 10 | 5.449591281 |
| TOTAL | 183.50 | 100 |

Example 5

A black-to-green color-change writing composition according to certain embodiments of the invention herein is shown in Table 5. The erasable writing composition is formed by combining stearic acid, stearyl alcohol, phenolic resin, a mineral filler, leuco dyes, and a (permanent) dry pigment.

TABLE 5

Black-to-Green Color-Change Writing Composition

| Component | Grams | Weight Percentage (wt %) |
|---|---|---|
| stearic acid | 75 | 40.98360656 |
| stearyl alcohol | 75 | 40.98360656 |
| Mineral filler (Ultrex 96 (BASF) calcined clay) | 10 | 5.464480874 |
| phenolic resin (Durez 32420) | 10 | 5.464480874 |
| Leuco dye (Pergascript Red 1-6B) | 1.5 | 0.819672131 |
| Leuco dye (Copikem Cyan 39) | 1.5 | 0.819672131 |
| Dry pigment (Fluorescent Green Pigment) | 10 | 5.464480874 |
| TOTAL | 183.00 | 100 |

Example 6

A blue-to-green color-change writing composition according to certain embodiments of the invention herein is shown in Table 6. The erasable writing composition is formed by combining stearic acid, stearyl alcohol, phenolic resin, a mineral filler, leuco dye, and a (permanent) dry pigment.

TABLE 6

Blue-to-Green Color-Change Writing Composition

| Component | Grams | Weight Percentage (wt %) |
|---|---|---|
| stearic acid | 75 | 40.76086957 |
| stearyl alcohol | 75 | 40.76086957 |
| Mineral filler (Ultrex 96 (BASF) calcined clay) | 10 | 5.434782609 |
| phenolic resin (Durez 32420) | 10 | 5.434782609 |
| Leuco dye (Copikem Cyan 39) | 4 | 2.173913043 |
| Dry pigment (Fluorescent Green Pigment) | 10 | 5.434782609 |
| TOTAL | 184.00 | 100 |

Example 7

A red-to-yellow color-change writing composition according to certain embodiments of the invention herein is shown in Table 7. The erasable writing composition is formed by combining stearic acid, stearyl alcohol, phenolic resin, a mineral filler, leuco dye, and a (permanent) non-leuco dye.

TABLE 6

Blue-to-Green Color-Change Writing Composition

| Component | Grams | Weight Percentage (wt %) |
|---|---|---|
| stearic acid | 75 | 42.63786242 |
| stearyl alcohol | 75 | 42.63786242 |
| Mineral filler (Ultrex 96 (BASF) calcined clay) | 10 | 5.685048323 |
| phenolic resin (Durez 32420) | 10 | 5.685048323 |
| Leuco dye (Pergascript Orange 1-G) | 2.1 | 1.193860148 |
| Leuco dye (Pergascript Red 1-6B) | 0.8 | 0.454803866 |
| Non-Leuco Dye (Yellow 3G Dye) | 3 | 1.705514497 |
| TOTAL | 175.90 | 100 |

Example 8

A basic erasing medium according to certain embodiments of the invention herein is shown in Table 8. The medium is formed by combining water, triisopropylamine, citric acid, surfactant, and antimicrobial preservatives.

TABLE 8

Basic Erasing Medium

| Component | Weight Percentage (wt %) |
|---|---|
| Water | 73 |
| Triisopropylamine | 25 |
| Citric acid | 0.5 |
| Surfactant (Surfynol 104A) | 0.5 |
| Preservative (Reputain B30) | 0.2 |
| Preservative (Mergal 395) | 0.8 |
| TOTAL | 100 |

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:
1. A kit comprising:
 a writing instrument, the writing instrument comprising a writing composition including:
  a phenolic resin, the phenolic resin is present in an amount between about 0.1 wt % and 10 wt %;
  a reaction medium comprising stearic acid and stearyl alcohol, and wherein
   the stearic acid is present in an amount between about 35 wt % and 50 wt %, and
   the stearyl alcohol is present in an amount between about 35 wt % and 50 wt %;

at least one leuco dye present in an amount between about 0.1 wt % and 6 wt %; and
optionally at least one additive that is present in an amount between about 0.1 wt % and 1 wt %; and
an erasing medium comprising:
water,
at least one proton donor or electron acceptor,
at least one surfactant, and
at least one preservative.

2. The kit of claim 1, wherein the writing composition further comprises an inert mineral filler.

3. The kit of claim 2, wherein the inert mineral filler comprises one or more of wollastonite, talc, kaolin clay, burgess clay, mica, bentonite, or calcium carbonate.

4. The kit of claim 2, wherein:
the phenolic resin is present in an amount between about 0.1 wt % and 10 wt %; wherein:
the stearic acid is present in an amount between about 35 wt % and 45 wt %, and
the stearyl alcohol is present in an amount between about 35 wt % and 45 wt %;
the at least one leuco dye is present in an amount between about 0.1 wt % and 6 wt %;
the inert mineral filler is present in an amount between about 1 wt % and 10 wt %; and
the optional at least one additive is present in an amount between about 0.1 wt % and 1 wt %.

5. The kit of claim 1, wherein the writing composition further comprises at least one of a pigment or a non-leuco dye.

6. The kit of claim 5, wherein:
the phenolic resin is present in an amount between about 0.1 wt % and 10 wt %;
the reaction medium comprises stearic acid and stearyl alcohol, and wherein
the stearic acid is present in an amount between about 35 wt % and 45 wt %, and
the stearyl alcohol is present in an amount between about 35 wt % and 45 wt %;
the at least one leuco dye is present in an amount between about 0.1 wt % and 6 wt %;
the mineral filler is present in an amount between about 1 wt % and 10 wt %;
the at least one of a pigment or a non-leuco dye is present in an amount between about 1 wt % and 8 wt %; and
the optional at least one additive is present in an amount between about 0.1 wt % and 1 wt %.

7. The kit of claim 1, wherein the composition comprises at least one additive, and the at least one additive is selected from dispersing agents, anti-blooming agents, compatibilizers, pearlescents, processing aids, thermal stabilizers, scents, glitter, lubricants, plasticizers, preservatives, defoamers, surfactants, buffers, and combinations thereof.

8. The kit of claim 1, wherein the writing instrument is produced via injection molding or extrusion.

9. The kit of claim 1, wherein the writing instrument is encased within a sheath or covered in a protective coating layer.

10. A kit comprising:
a writing instrument, the writing instrument comprising a writing composition including:
a phenolic resin,
a reaction medium comprising one or more of fatty acids, waxes, alkanes, and alkenes,
at least one leuco dye, and
optionally at least one additive; and
an erasing medium comprising:
water present in an amount between about 65 wt % and 95 wt %;
at least one proton donor or electron acceptor present in an amount between about 1 wt % and 30 wt %;
at least one surfactant present in an amount between about 0.1 wt % and 2 wt %; and
at least one preservative present in an amount between about 0.5 wt % and 2 wt %.

11. The kit of claim 10, wherein the at least one proton donor or electron acceptor includes triisopropylamine and citric acid.

12. The kit of claim 11, wherein the triisopropylamine is present in an amount between about 1 wt % and 30 wt %, and wherein the citric acid is present in an amount between about 0.1 wt % and 1 wt %.

13. The kit of claim 10, wherein the preservative is an antimicrobial preservative.

* * * * *